United States Patent [19]
Denker et al.

[11] Patent Number: 5,067,164
[45] Date of Patent: Nov. 19, 1991

[54] HIERARCHICAL CONSTRAINED AUTOMATIC LEARNING NEURAL NETWORK FOR CHARACTER RECOGNITION

[75] Inventors: John S. Denker, Leonardo; Richard E. Howard, Highland Park; Lawrence D. Jackel, Holmdel; Yann LeCun, Middletown, all of N.J.

[73] Assignee: AT&T Bell Laboratories, Murray Hill, N.J.

[21] Appl. No.: 444,455

[22] Filed: Nov. 30, 1989

[51] Int. Cl.$^5$ .............................................. G06K 9/62
[52] U.S. Cl. .................................... 382/15; 364/276.6
[58] Field of Search .................... 382/14, 15; 364/513, 364/274.9, 276.6, 972.4

[56] References Cited

U.S. PATENT DOCUMENTS

| | | | |
|---|---|---|---|
| 4,760,604 | 7/1988 | Cooper et al. | 382/15 |
| 4,774,677 | 9/1988 | Buckley | 382/15 |
| 4,897,811 | 1/1990 | Scofield | 364/513 |

OTHER PUBLICATIONS

D. E. Rumelhart et al., Parallel Distr. Proc.: Explorations in Microstructure of Cognition, vol. 1, 1986, "Learning Internal Representations by Error Propagation", pp. 318–362.

R. P. Lippmann, IEEE ASSP Magazine, vol. 4, No. 2, Apr. 1987, "An Introduction to Computing with Neural Nets", pp. 4–22.

Y. LeCun, Connectionism in Perspective, R. Pfeifer, Z. Schreter, F. Fogelman, L. Steels, (Eds.), 1989, "Generalization and Network Design Strategies", pp. 143–55.

Y. LeCun et al., IEEE Comm. Magazine, Nov. 1989, "Handwritten Digit Recognition: Applications of Neural . . . ", pp. 41–46.

*Primary Examiner*—David K. Moore
*Assistant Examiner*—Michael Cammarata
*Attorney, Agent, or Firm*—Gregory C. Ranieri

[57] ABSTRACT

Highly accurate, reliable optical character recognition is afforded by a layered network having several layers of constrained feature detection wherein each layer of constrained feature detection includes a plurality of constrained feature maps and a corresponding plurality of feature reduction maps. Each feature reduction map is connected to only one constrained feature map in the same layer for undersampling that constrained feature map. Units in each constrained feature map of the first constrained feature detection layer respond as a function of a corresponding kernel and of different portions of the pixel image of the character captured in a receptive field associated with the unit. Units in each feature map of the second constrained feature detection layer respond as a function of a corresponding kernel and of different portions of an individual feature reduction map or a combination of several feature reduction maps in the first constrained feature detection layer as captured in a receptive field of the unit. The feature reduction maps of the second constrained feature detection layer are fully connected to each unit in the final character classification layer. Kernels are automatically learned by constrained back propagation during network initialization or training.

5 Claims, 13 Drawing Sheets

10

HIERARCHICAL CONSTRAINED AUTOMATIC LEARNING NEURAL NETWORK FOR CHARACTER RECOGNITION

TECHNICAL FIELD

This invention relates to the field of pattern recognition and, more particularly, to massively parallel, constrained networks for optical character recognition.

BACKGROUND OF THE INVENTION

Computation systems based upon adaptive learning with fine-grained parallel architectures have moved out of obscurity in recent years because of the growth of computer-based information gathering, handling, manipulation, storage, and transmission. Many concepts applied in these systems represent potentially efficient approaches to solving problems such as providing automatic recognition, analysis and classification of character patterns in a particular image. Ultimately, the value of these techniques in such systems depends on their effectiveness or accuracy relative to conventional approaches.

In a recent article by Y. LeCun entitled "Generalization and Network Design Strategies," appearing in Connectionism in Perspective, pp. 143-155 (Elsevier Science Publishers: North-Holland 1989), the author describes five different layered network architectures applied to the problem of optical digit recognition. Learning in each of the networks was attempted on pixel images of handwritten digits via inherent classification intelligence acquired from the back-propagation technique described by D. Rumelhart et al., Parallel Distributed Processing, Vol. I, pp. 318-362 (Bradford Books: Cambridge, Mass. 1986). Complexity of the networks was shown to increase finally to a hierarchical network having two levels of constrained feature maps. Performance of the hierarchical network exceeded that of the less complex networks. Moreover, it was postulated that the multiple levels of constrained feature maps provided additional control for shift invariance.

While the hierarchical network described above appears to have advanced the art of solving the character recognition or classification problem, it is equally apparent that existing systems lack sufficient accuracy to permit realization of reliable automatic character recognition apparatus.

SUMMARY OF THE INVENTION

Highly accurate, reliable optical character recognition is afforded by a layered network having several layers of constrained feature detection wherein each layer of constrained feature detection includes a plurality of constrained feature maps and a corresponding plurality of feature reduction maps. Each feature reduction map is connected to only one constrained feature map in the same layer for undersampling that constrained feature map. Units in each constrained feature map of the first constrained feature detection layer respond as a function of a corresponding kernel and of different portions of the pixel image of the character captured in a receptive field associated with the unit. Units in each feature map of the second constrained feature detection layer respond as a function of a corresponding kernel and of different portions of an individual feature reduction map or a combination of several feature reduction maps in the first constrained feature detection layer as captured in a receptive field of the unit. The feature reduction maps of the second constrained feature detection layer are fully connected to each unit in the final character classification layer. Kernels are automatically learned by constrained back propagation during network initialization or training.

Benefits realized from this network architecture are increased shift invariance, vastly reduced entropy, Vapnik-Chervonenkis dimensionality, and number of free parameters. As a result of these improvements, the network experiences a proportional reduction in the amount of training data and, therefore, training time required to achieve a given level of generalization performance.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
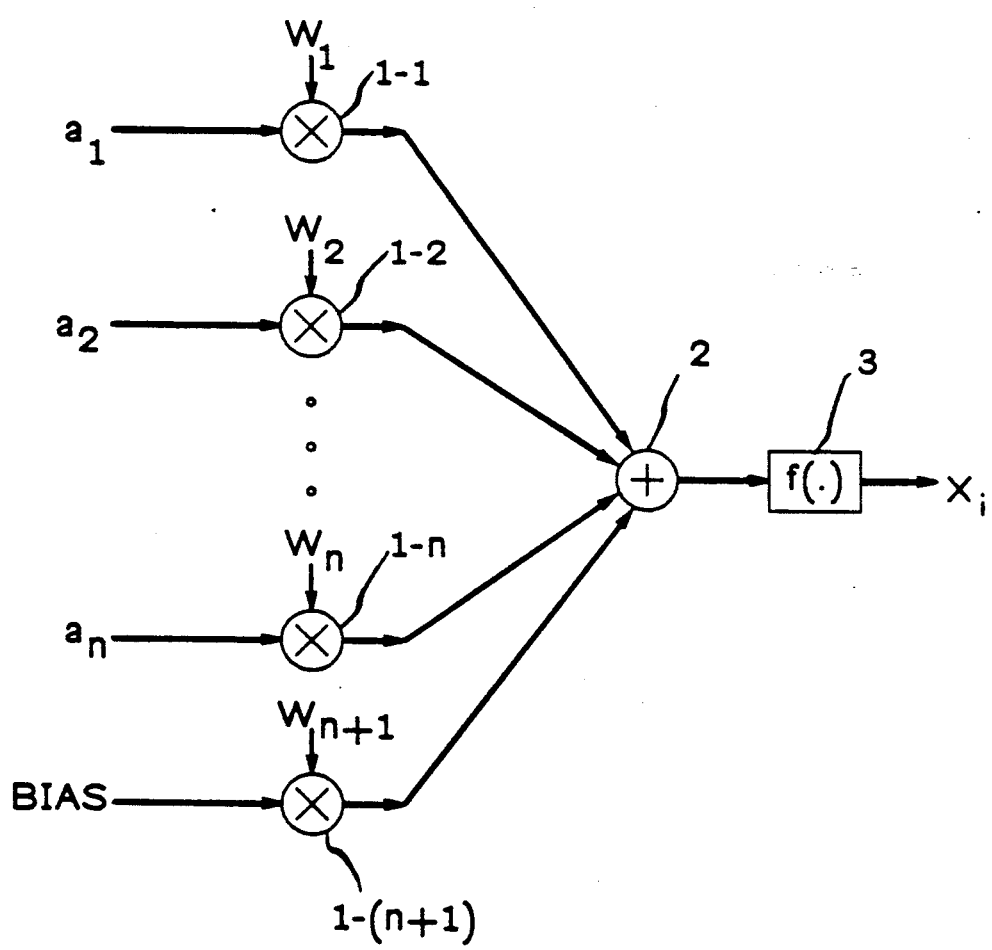
FIG. 1 is a simplified block diagram for each individual computational element in the network.

Computational elements as shown in FIG. 1 form the fundamental functional and interconnectionist blocks for a hierarchical constrained network realized in accordance with the principles of the invention. In general, a computational element forms a weighted sum of input values for $n+1$ inputs and passes the result through a nonlinearity to arrive at a single value. The input and output values for the computational element may be analog, quasi-analog such as multi-level and gray scale, or binary in nature. Nonlinearities commonly employed in computational elements include hard limiters, threshold logic elements, and sigmoidal nonlinearities, for example.

In operation, the computational element shown in FIG. 1 scans n neighboring input pixels, pixel values or unit values from an image or feature map wherein the pixels, pixel values and unit values have values represented as $a_1, a_2 \ldots, a_n$. An input bias is supplied to the $n+1$ input of a computational element. For simplicity, the bias is generally set to a constant value such as 1. The input values and the bias are supplied to multipliers 1—1 through 1-(n+1). The multipliers also accept input from a kernel having weights $w_1$ through $w_{n+1}$. Outputs from all multipliers are supplied to adder 2 which generates the weighted sum of the input values. As such, the output from adder 2 is simply the dot product of a vector of input values (including a bias value) with a vector representing the kernel of weights. The output value from adder 2 is passed through the nonlinear function in nonlinearity 3 to generate a single unit output value $x_i$. As will be understood more clearly below, unit output value $x_i$ is related to the value of the $i^{th}$ unit in the feature map under consideration.

In an example from experimental practice, an exemplary sigmoidal function for nonlinearity 3 is chosen as a scaled hyperbolic tangent function, $f(\alpha) = A \tan h\, S\alpha$ where $\alpha$ is the weighted sum input to the nonlinearity, A is the amplitude of the function, and S determines the slope of the function at the origin. As shown above, the nonlinearity is an odd function with horizontal asymptotes at $+A$ and $-A$. It is understood that nonlinear functions exhibiting an odd symmetry are believed to yield faster conversions of the kernel weights $w_1$ through $w_{n+1}$.

Weights for each of the kernels in the hierarchical constrained network were obtained using a trial and error learning technique known as back propagation. See the Rumelhart et al. reference cited above or see R. P. Lippmann, "An Introduction to Computing with Neural Nets", *IEEE ASSP Magazine*, Vol. 4, No. 2, pp. 4–22 (1987). Prior to training, each of weight in the kernel is initialized to a random value using a uniform distribution between, for example, $-2.4/F_i$ and $2.4/F_i$ where $F_i$ is the number of inputs (fan-in) of the unit to which the connection belongs. For the example shown in FIG. 1, the fan-in $F_i$ is equal to $n+1$. By using this initialization technique, it is possible to maintain values within the operating range of the sigmoid nonlinearity. During training, image patterns are presented in a constant order. Weights are updated according to the stochastic gradient or "on-line" procedure after each presentation of a single image pattern for recognition. A true gradient procedure may be employed for updating so that averaging takes place over the entire training set before weights are updated. It is understood that the stochastic gradient is found to cause weights to converge faster than the true gradient especially for large, redundant image data bases.

Standard techniques are employed to convert a handwritten character to the pixel array which forms the supplied character image. The character image may be obtained through electronic transmission from a remote location or it may be obtained locally with a scanning camera or other scanning device. Regardless of its source and in accordance with conventional practice, the character image is represented by an ordered collection of pixels. The ordered collection is typically an array. Once represented, the character image is generally captured and stored in an optical memory device or an electronic memory device such as a frame buffer.

Each pixel has a value associated therewith which corresponds to the light intensity or color or the like emanating from that small area on the visual character image. The values of the pixels are then stored in the memory devices. When reference is made to a particular map, it is understood that the terms "pixel" and "unit value(s)" are used interchangeably and include pixels, pixel values and unit values output from each computation element combining to form the map array. It may be more convenient to think in terms of planes or 2-dimensional arrays (maps) of pixels rather than pixel values or unit values for visualizing and developing an understanding of network operation. One such visualization of pixel values and unit values using pixel intensity levels for the original image and the subsequent feature maps is shown in FIGS. 12-15.

In addition to visualizing pixel and unit values with pixel intensity levels, it is also useful to visualize the array of weights in the kernel in this manner. See, for example, FIGS. 7-9 which represent arrays of kernels learned during an experiment with the network embodiment in FIG. 2. Also, by visualizing the kernel as an array, it is possible to understand more easily how and what the kernel affects in the pixel array undergoing computation.

Various other preprocessing techniques used to prepare a character image as a pixel array for character recognition may include various linear transformations such as scaling, size normalization, deskewing, centering, and translation or shifting, all of which are well known to those skilled in the art. In addition, transformation from the handwritten character to a gray scale pixel array may be desirable to preserve information which would otherwise be irretrievably lost during preprocessing. The latter transformation is understood to be well known to those skilled in the art.

Figure 3:
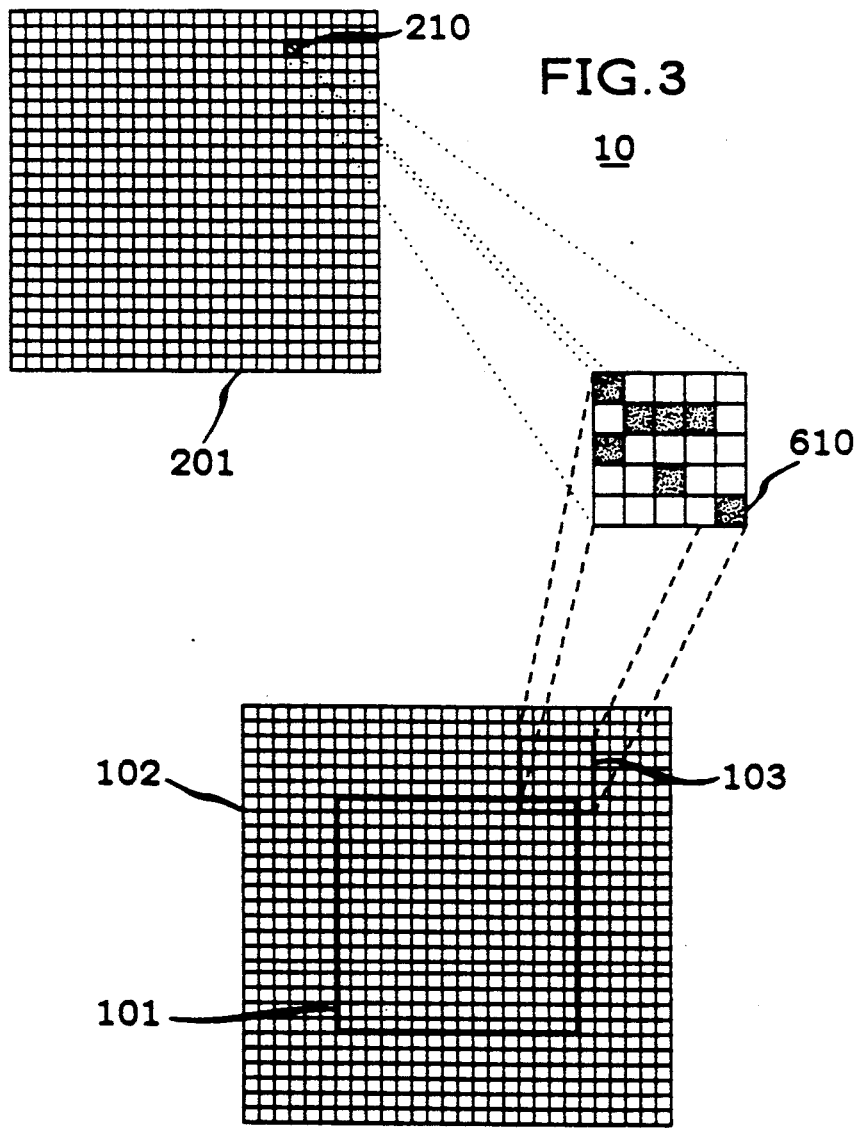
FIGS. 3, 4, 5 and 6 are simplified diagrams showing the connective relationship between units in a map at one level with a unit in a map at the higher adjacent level.

In addition to the operations listed above for preparation of the image for character recognition, it is generally desirable to provide a uniform, substantially constant level border around the original image. Such a border is shown in FIG. 3 in array 102 wherein the array elements outside array 101 in image 10 constitute the uniform border.

Realization of the computational elements and, for that matter, the entire network may be in hardware or software or some convenient combination of hardware and software. Much of the network presented herein has been implemented using a SUN workstation with simple programs performing the rudimentary mathematical operations of addition, subtraction, multiplication, and comparison. Pipelined devices, microprocessors, and special purpose digital signal processors also provide convenient architectures for realizing the network in accordance with the principles of the invention. MOS VLSI technology has also been employed to implement particular weighted interconnection networks of the type shown in FIG. 2. Local memory is desirable to store pixel and unit values and other temporary computation results.

Figure 2:
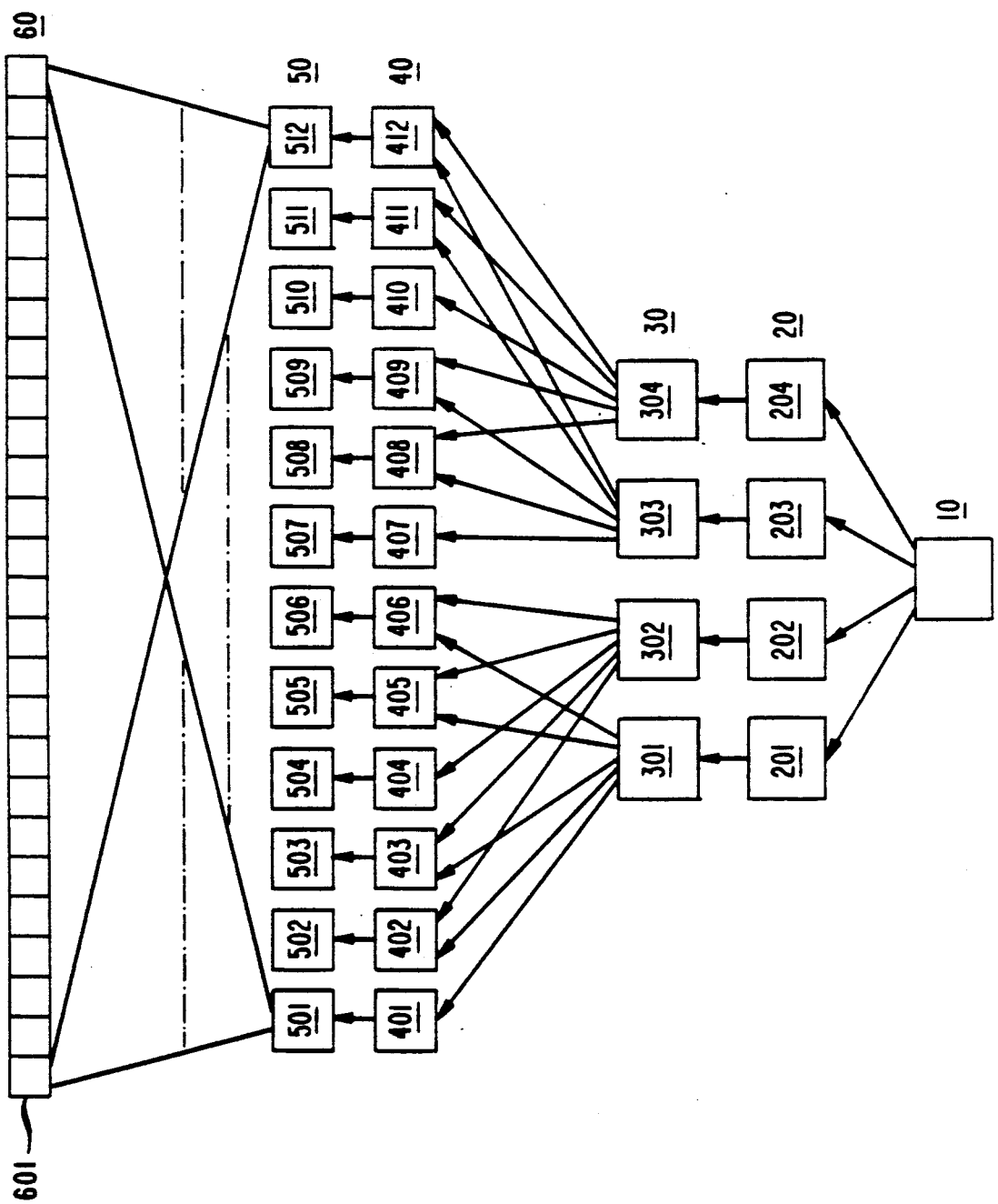
FIG. 2 is a simplified block diagram of an exemplary hierarchical constrained automatic learning network in accordance with the principles of the invention.

FIG. 2 shows a simplified block diagram of an exemplary embodiment for a hierarchical constrained automatic learning network in accordance with the principles of the invention. The network performs character recognition from a supplied image via massively parallel computations. Each array (box) shown in levels 20 through 60 is understood to comprises a plurality of computational elements, one per array unit.

The network shown in FIG. 2 comprises first and second feature detection layers and a character classification layer. Each layer comprises one or more feature maps or arrays of varying size. In most conventional applications, the maps are square. However, rectangular and other symmetric and non-symmetric or irregular map patterns are contemplated. The arrangement of detected features is referred to as a map because an array is constructed in the memory device where the pixels (unit values) are stored and feature detections from one lower level map are placed in the appropriate locations in the array for that map. As such, the presence or substantial presence (using gray scale levels) of a feature and its relative location are thus recorded.

The type of feature detected in a map is determined by the kernel being used. In constrained feature maps, the same kernel is used for each unit of the same map. That is, a constrained feature map scans a pixel array for the occurrence of the particular feature defined by one particular kernel. As such, the term "constrained" is understood to convey the condition that computation elements comprising a particular map are forced to share the same set of kernel weights. This results in the same feature being detected at different locations in an input image. It is understood that this technique is also known as weight sharing.

For those skilled in the art, it will be understood that the kernel defines a receptive field (5 pixels×5 pixels or 2 pixels×2 pixels) on the plane of the image pixels or map units being detected for occurrence the feature defined by the kernel. By placement of the kernel on a pixel array, it is possible to show what pixels are being input to the computation element in the feature map and which unit on the feature map is being activated. The unit being activated corresponds generally to an approximate location of the feature occurrence in the map under detection.

The first feature detection layer includes a plurality of constrained feature maps 20 and a corresponding plurality of feature reduction maps 30. As shown in the figure, the particular embodiment of the network includes four each of the constrained feature maps and the corresponding feature reduction maps in the first layer. The second feature detection layer includes a plurality of constrained feature maps 40 and a corresponding plurality of feature reduction maps 50. As shown in the figure, the particular embodiment of the network includes twelve each of the constrained feature maps and the corresponding feature reduction maps in the second layer.

The final layer of the network comprises a character classification layer 60 which is fully connected to all feature reduction maps of the second feature detection layer. The character classification layer generates an indication of the character recognized by the network from the supplied original image. The term "fully connected" is understood to mean that the computation element associated with a pixel in character classification layer 60 receives its input from every pixel or unit included in the preceding layer of maps, that is, layer 50.

Interconnection lines from layer to layer in the network have been drawn to show which maps in a preceding layer provide inputs to each and every computation element whose units form the maps in the layer of interest. For example, constrained feature maps 201 through 204 detect different features from image 10 in the process of generating the constrained feature maps. Proceeding to the next level of maps, it is seen that feature reduction map 301 derives its input solely from the units in constrained feature map 201. Similarly, feature reduction maps 302 through 304 derive their input solely from the units in constrained feature maps 202 through 204, respectively. For the network embodiment shown in FIG. 2, interconnection from the first feature detection layer to the second feature detection layer is somewhat more complicated. Constrained feature maps 401, 404, 407, and 410 derive their inputs solely from units in feature reduction maps 301 through 304, respectively. Constrained feature maps 402, 403, 405, and 406 derive their inputs from combinations of units from feature reduction maps 301 and 302; constrained feature maps 408, 409, 411 and 412 derive their inputs from combinations of units from feature reduction maps 303 and 304. Finally, individual feature reduction maps 501 through 512 derive their inputs solely from units in individual ones of corresponding constrained feature maps 401 through 412, respectively.

It should be noted that the character classification layer 60 includes a sufficient number of elements for the particular character recognition problem being solved by the network. That is, for the recognition of either upper case or lower case Latin alphabetic characters, one exemplary embodiment of layer 60 would include 26 units signifying the letters A through Z or a through z. On the other hand, for the recognition of numeric characters, one embodiment of layer 60 would include only 10 units signifying the numbers 0 through 9.

For convenience and ease of understanding, the bias input to the computational element and its associated weight in the kernel shown in FIG. 1 have been omitted from FIGS. 3 through 6 and in the description herein. In experimental practice, the bias is set to 1 and its corresponding weight in the kernel is learned through back propagation.

FIG. 3 shows sample interconnections and feature detection from image 10 to constrained feature map 201. Unit 210 in map 201 observes a 5×5 neighborhood on the input image plane and uses weights from an exemplary kernel 610 to develop the value of unit 210. The gray scale unit value shows the presence, substantial presence, substantial absence, or absence of that feature in the input image in that neighborhood. The function performed by each computational element in the constrained feature map is interpreted as a nonlinear convolution of a 5×5 receptive field of image pixels or units with a 5×5 kernel. For units (computation elements) that are one unit apart in map 201, their receptive fields in the input layer are one pixel apart. Other units in constrained feature map 201 use the same kernel as used by unit 210. Other maps in layer 20 include units which operate on the image in a manner identical to map 201 using different kernels from that show in FIG. 3. See FIG. 7 for differences in kernels for layer 20.

As shown in FIG. 3, image 10 includes a 16×16 array 101 comprising an image of the original character surrounded by a constant-valued border which is 12 pixels wide resulting in a 28×28 image array 102. Constrained feature map 201 is shown as a 24×24 array.

Figure 4:
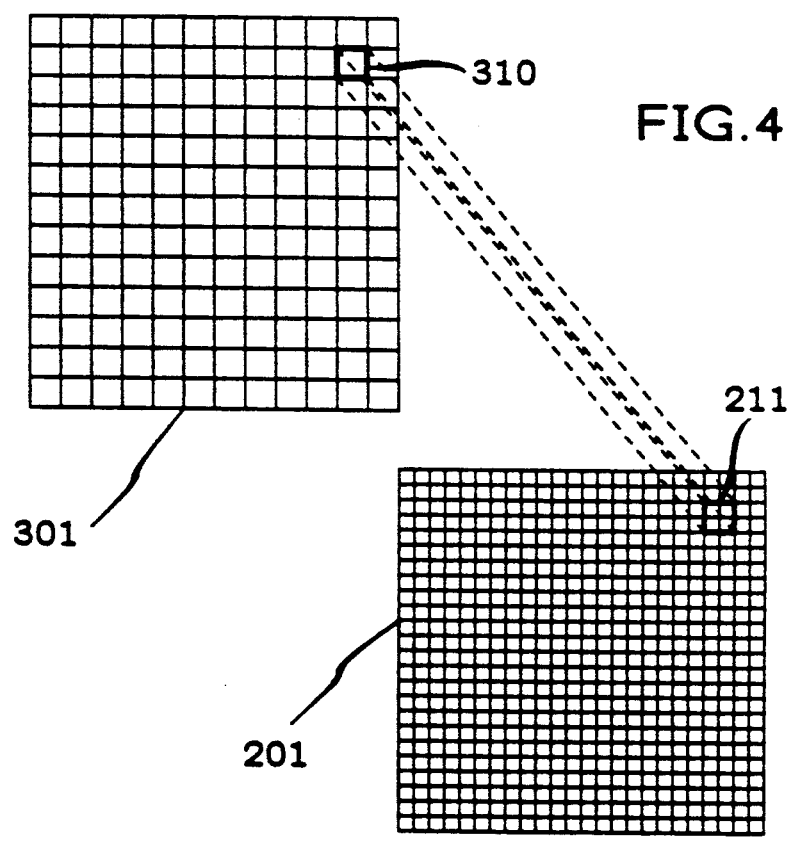

FIG. 4 shows an interconnection from constrained feature map 201 to feature reduction map 301 which results in an undersampling of the units in map 201. In the example shown, feature reduction map 301 is depicted as a 12×12 array. Unit (computational element) 310 receives input from 2×2 receptive field 211 on the input plane of map 201. The function performed by the computational element associated with the unit may include simple averaging of the input units from the 2×2 receptive field on map 201. Adjacent units in map 301 have receptive fields two units apart in map 201. Other units in feature reduction map 301 use the same kernel as used by unit 210. Other maps in layer 30 include units which operate on the image in a manner identical to map 301 using substantially identical kernels from that for map 301.

Figure 5:
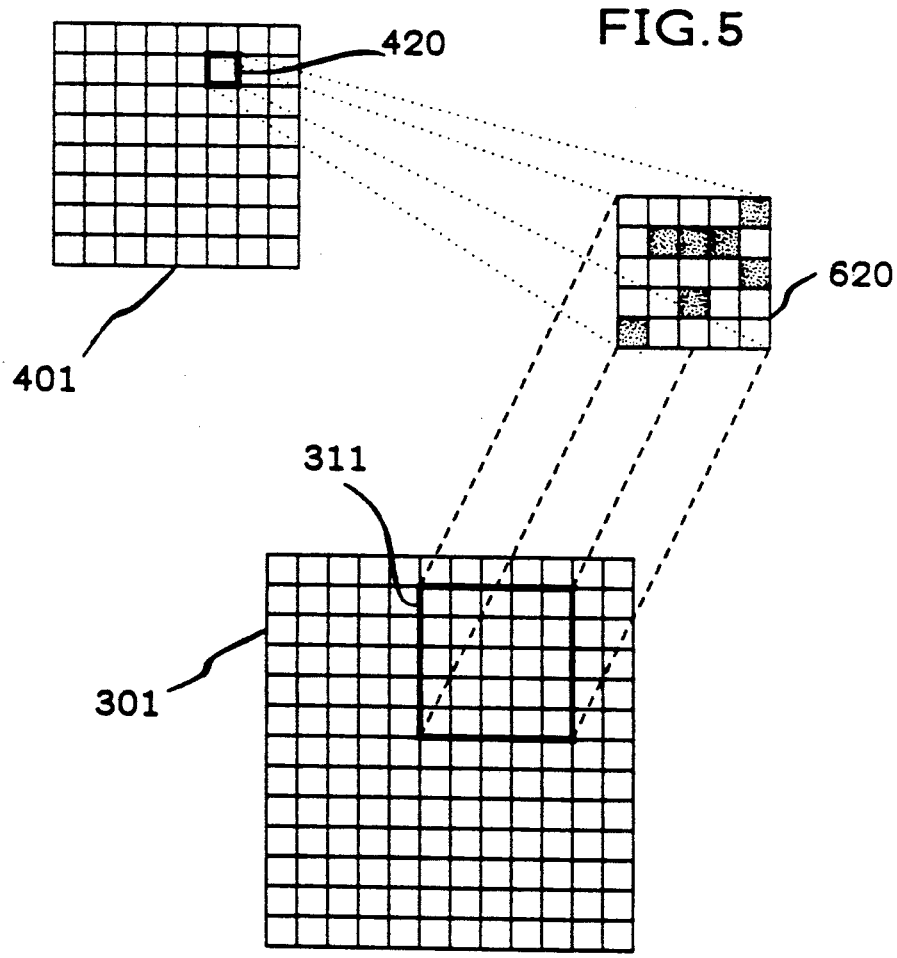

FIG. 5 shows the interconnection from feature reduction map 301 to unit 420 in constrained feature map 401 in the second feature detection layer. This interconnection is similar to the one shown in FIG. 3. Functionally, this interconnection is a nonlinear convolution with a 5×5 kernel for connections to maps 401, 404, 407, and 410. All other interconnections between the first and second feature detection layers result in a nonlinear convolution using a composite kernel or two separate kernels (such as two 5×5 kernels) on a composite array of units from similar (e.g., 5×5) receptive fields on two different feature reduction maps. As shown in FIG. 5, map 301 is a 12×12 array and map 401 is an 8×8 array. Other units in constrained feature map 401 use the same kernel as used by unit 420. Other maps in layer 40 include units which operate on the image in a manner identical to map 401 using different kernels from that show in FIG. 5. See FIGS. 7-9 for differences in kernels for layer 40.

Figure 6:
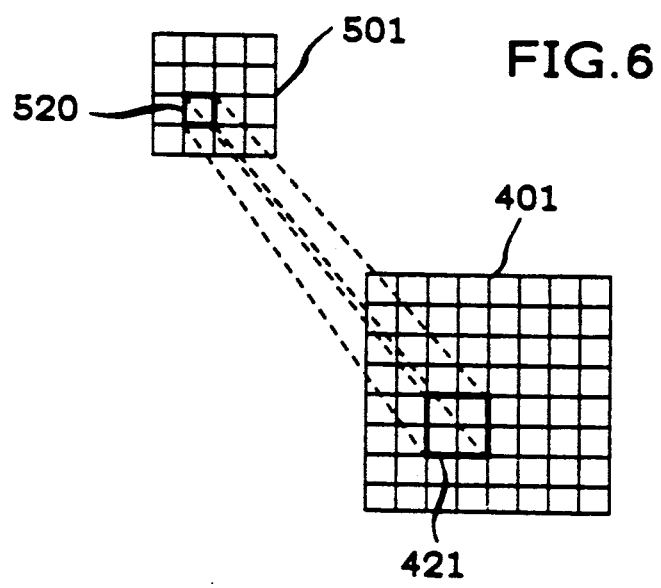

FIG. 6 shows the interconnection from constrained feature map 401 to unit 520 in feature reduction map 501. For the example shown, map 401 is an 8×8 array and map 501 is a 4×4 array. Unit 520 in the feature reduction map employs a 2×2 receptive field 421 on the input plane of constrained feature map 401. The function performed in the computational element may include simple averaging of the inputs in the receptive field. Adjacent units in map 501 have receptive fields two units apart in map 401. Other units in feature reduction map 501 use the same kernel as used by unit 520. Other maps in layer 50 include units which operate on the image in a manner identical to map 501 using substantially identical kernels from that for map 501.

Figure 7:
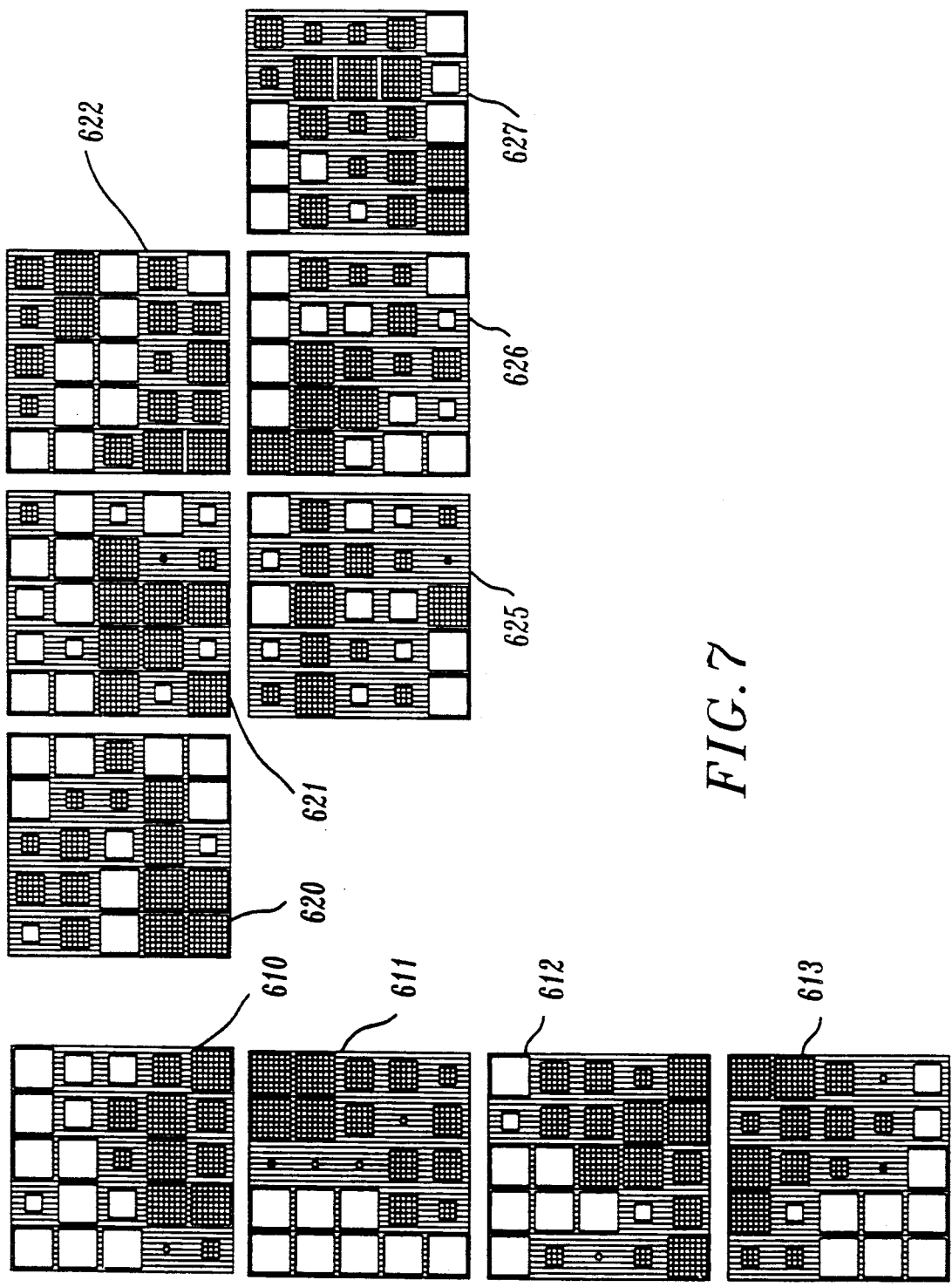
FIGS. 7-9 are a collection of exemplary kernel representations utilized in the network of FIG. 2.
Figure 8:
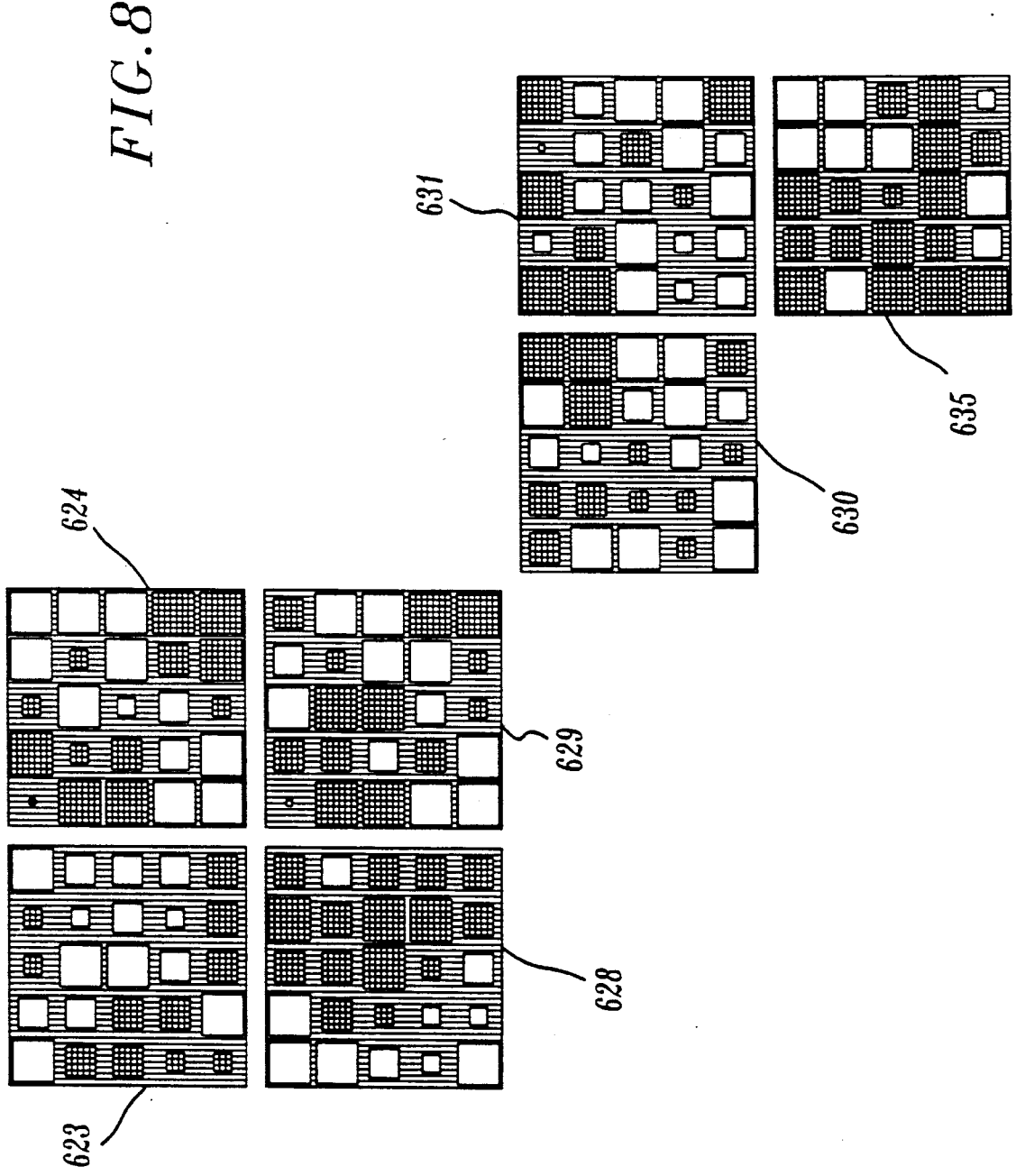
Figure 9:
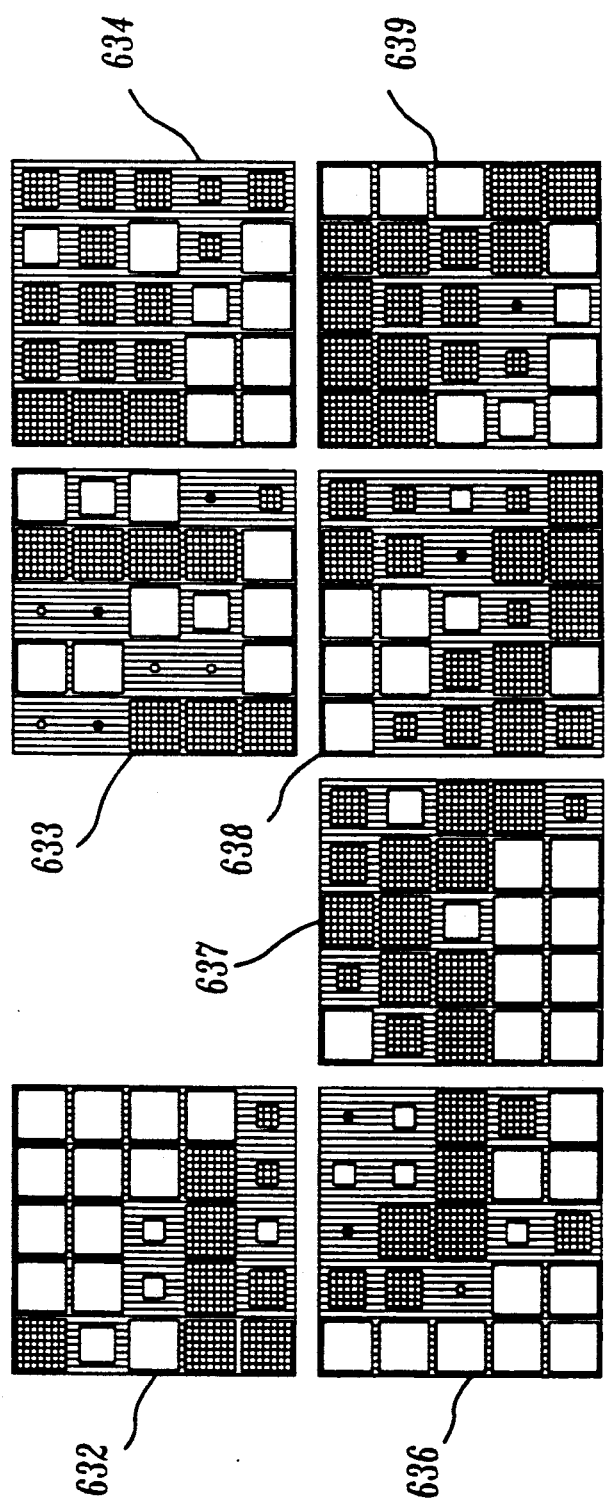
Figure 10:
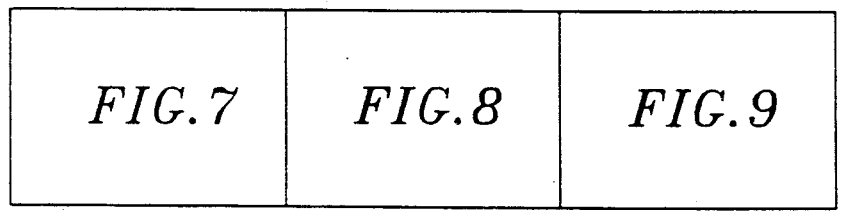
FIG. 10 shows the presentation of FIGS. 7-9.
Figure 11:
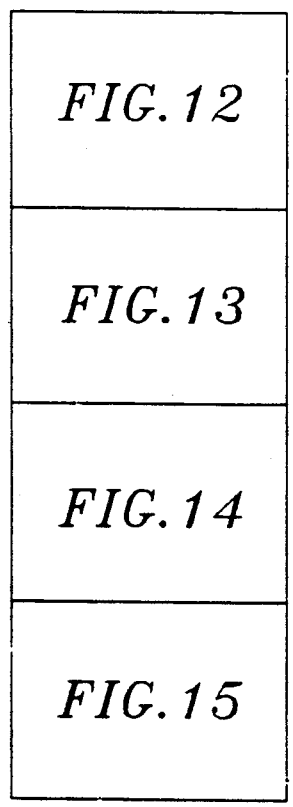
FIG. 11 shows the presentation of FIGS. 12-15.
Figure 12:
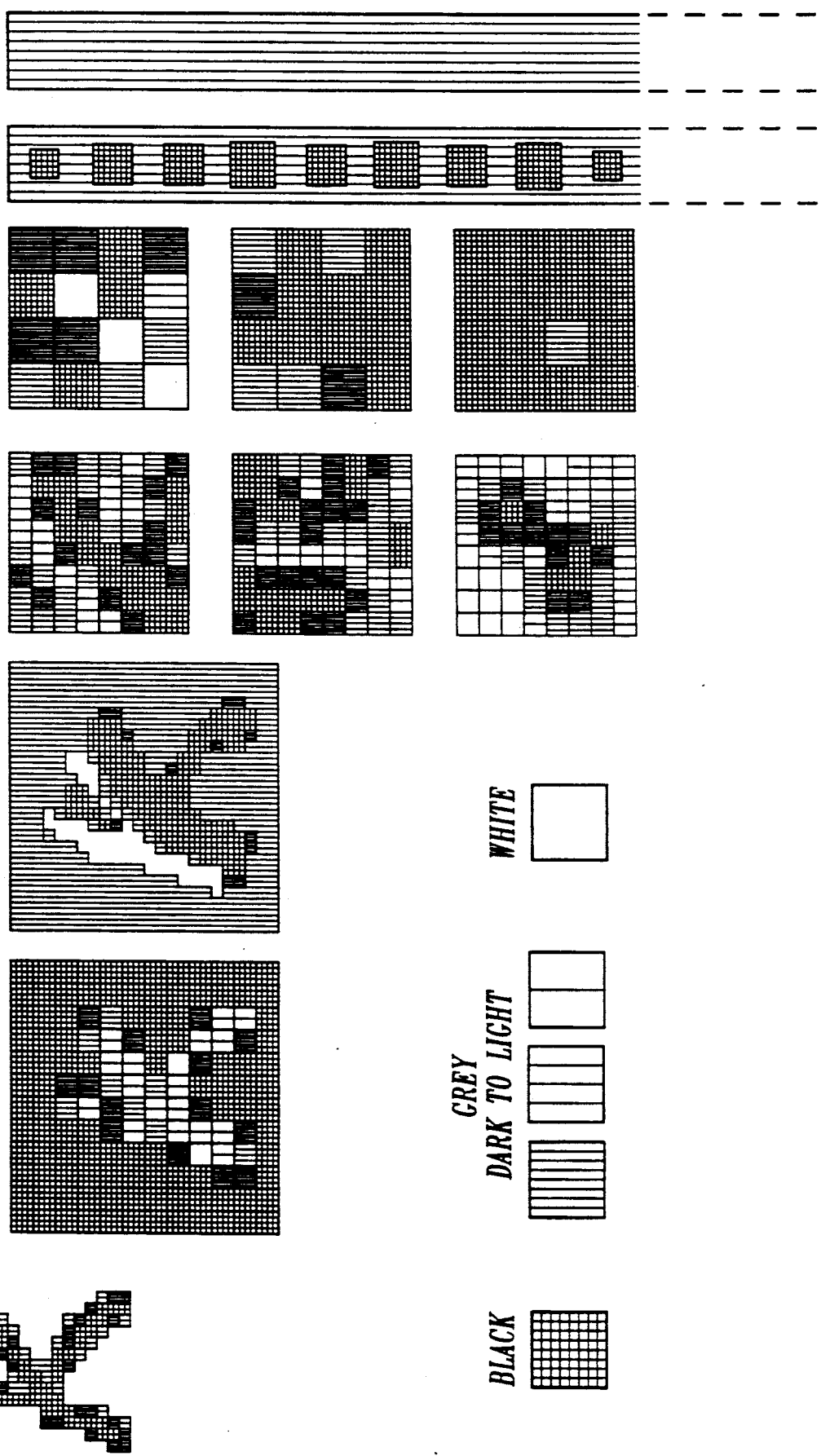
FIGS. 12-15 are a collection of exemplary feature map representations produced by the network embodiment in FIG. 2 during alphabetic character recognition.
Figure 13:
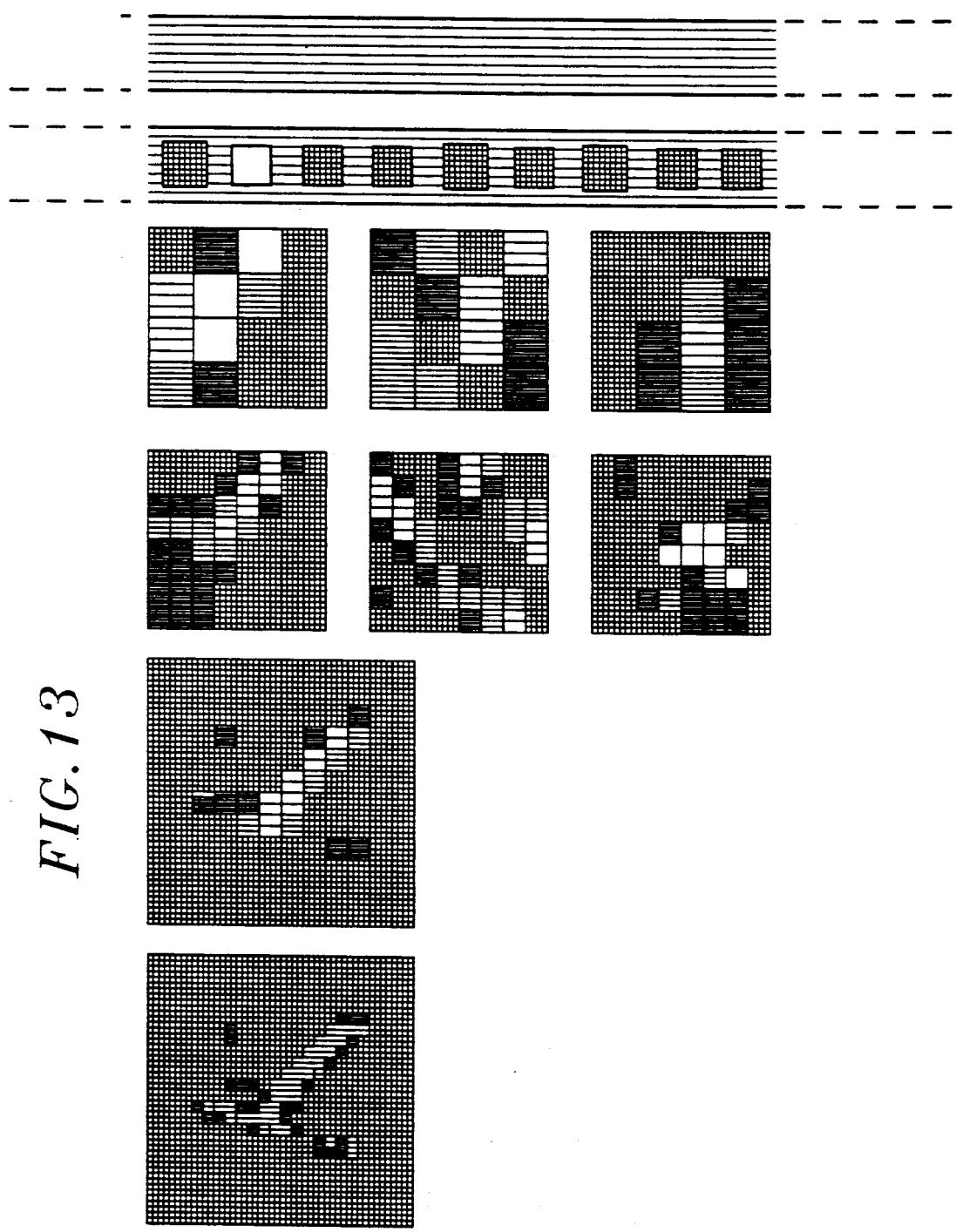
Figure 14:
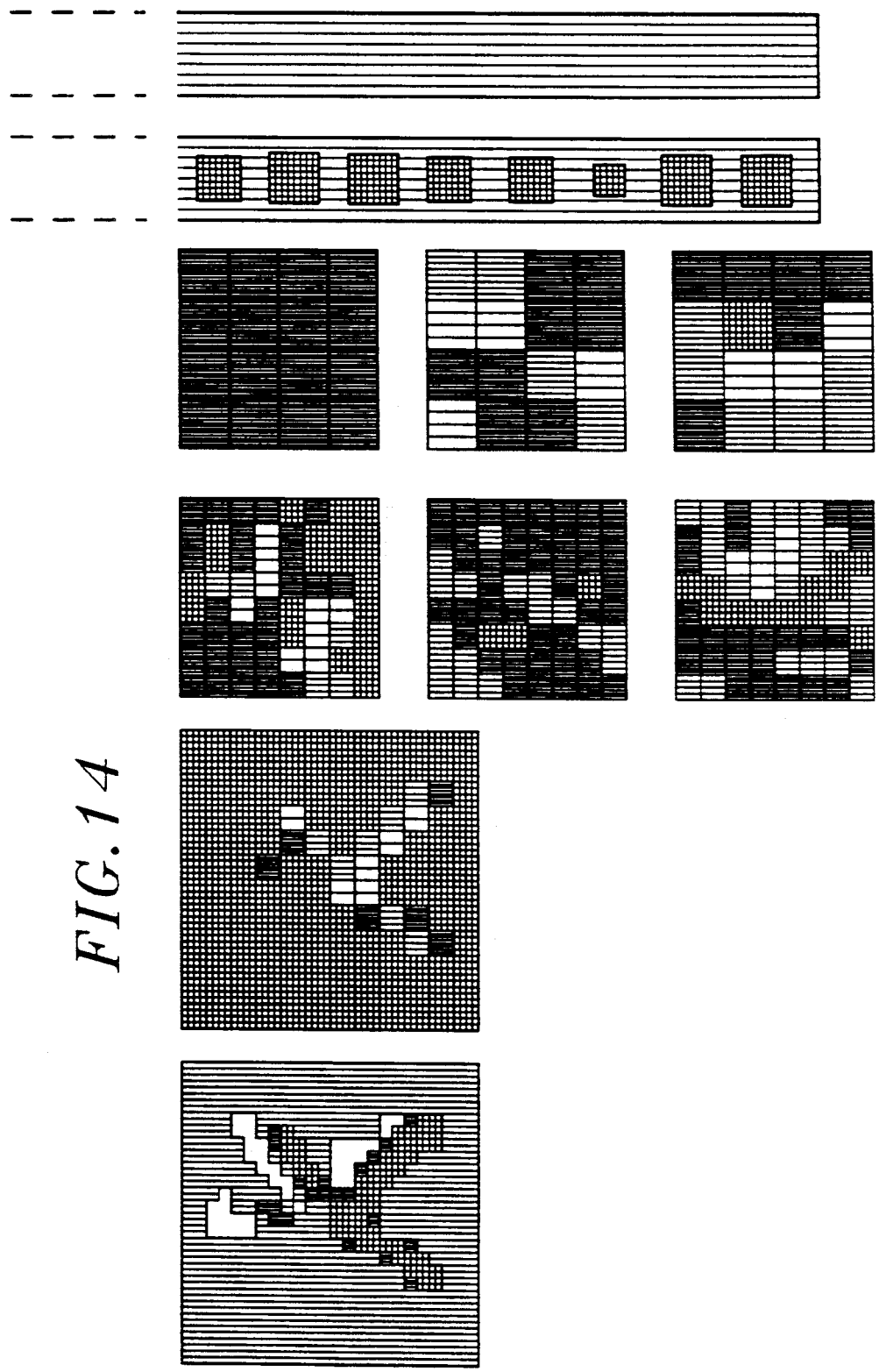
Figure 15:
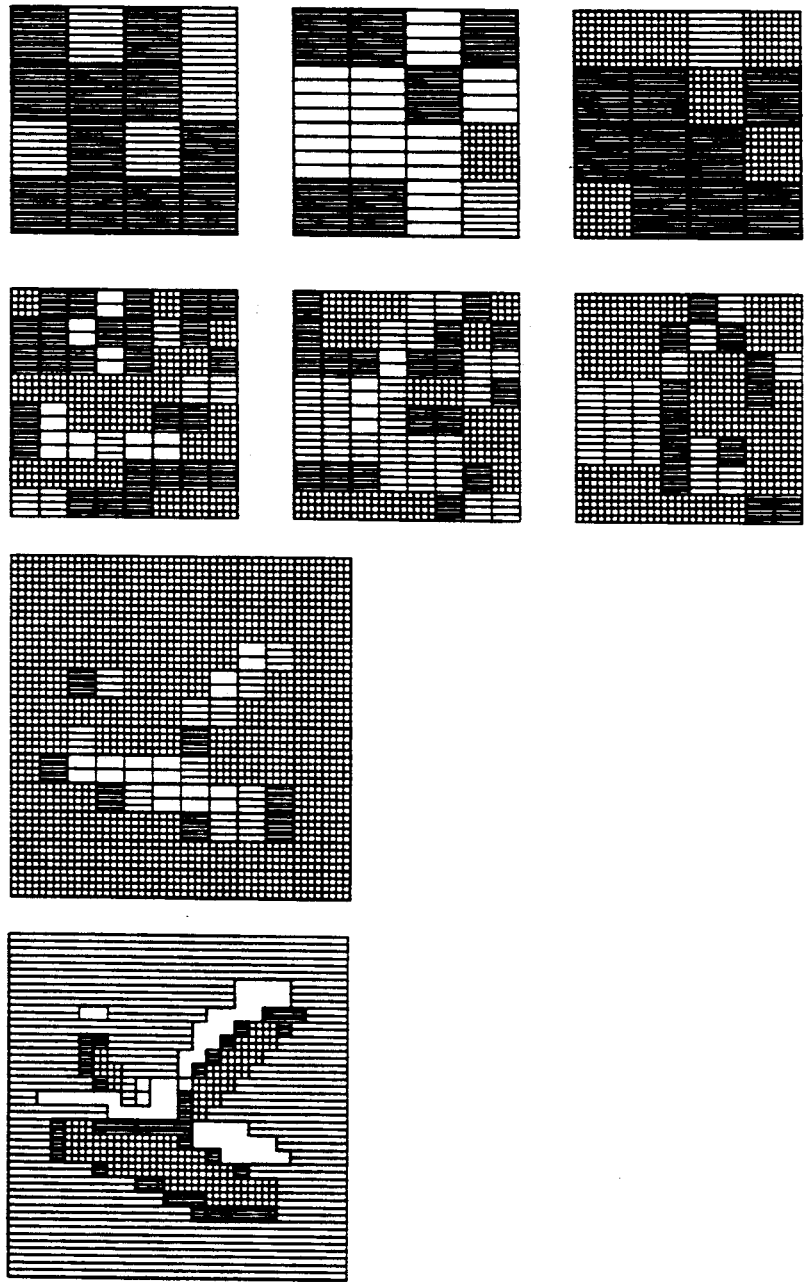

FIGS. 7-9 shows an exemplary set of kernels learned for the network shown in FIG. 2. The kernels are used by the computational elements for constrained feature maps in the first and second feature detection layers. Increased brightness levels for the individual squares shown by less dense cross-hatching, more positive analog (gray level) values for the weights in the kernel. Increased darkness levels for the individual squares shown by more dense cross-hatching, indicate more negative analog (gray level) values for the weights in the kernel. Kernels 610 through 613 are employed by constrained feature maps 201 through 203, respectively. Kernels 620 through 624 are employed on feature reduction map 301 to compute units in constrained feature maps 401, 402, 403, 405, and 406. Kernels 625 through 629 are employed by constrained feature maps 302 to compute units in constrained feature maps 402 through 406. Kernels 630 through 634 are employed on feature reduction map 303 to compute units in constrained feature maps 407, 408, 409, 411, and 412. Kernels 635 through 639 are employed by constrained feature maps 304 to compute units in constrained feature maps 408 through 412.

FIGS. 12-15 shows units in each map at varying brightness (darkness) levels during an experiment in which a handwritten upper case letter "K" was being recognized by the network. Locations of the maps correspond approximately to their locations in FIG. 2. That is, the original image appears in the upper left of FIG. 12; the first column in FIGS. 12-15 corresponds to the maps in level 20; the second column in FIGS. 12-15 corresponds to the maps in level 30; the third column in FIGS. 12-15 corresponds to the maps in level 40; the fourth column in FIGS. 12-15; corresponds to the maps in level 50; and the fifth column in FIGS. 12-15 corresponds to the output of the classification layer 60.

For the exemplary network embodiment shown in FIGS. 2 through 15, it has been estimated that there are approximately 90,000 connections and only approximately 2600 free parameters. Note, for example, that the connection from layer 30 to layer 40 involves 32,000 input connections and 768 output units. These figures are approximate because they exclude connections for the biases.

It should be clear to those skilled in the art that receptive fields and array sizes may be changed without departing from the spirit and scope of this invention. Moreover, it should also be clear to those skilled in the art that other sets of alphabetic and alphanumeric characters can be recognized with only slight adjustments to the network architecture.

We claim:

1. A massively parallel computation network for character recognition of an image map having a plurality of image units, said network comprising first and second feature detection layer means wherein each of said feature detection layer means includes a plurality of constrained feature maps and a corresponding plurality of feature reduction maps, each constrained feature map and each feature reduction map comprising a plurality of units and a corresponding plurality of computation elements for generating values for said units in said map, each of said feature reduction maps having fewer units than each of said constrained feature maps, said computation element having a weighting kernel associated therewith and being responsive to a plurality of substantially neighboring units from at least a predetermined other map for mapping a dot product of said associated weighting kernel with said predetermined plurality of substantially neighboring units into an output value in accordance with a selected nonlinear criterion, said computation element responsive to a different plurality of substantially neighboring units than each other computation element associated with the same map, said second feature detection layer means having fewer units than said first feature detection layer means, said constrained feature maps of said first feature detection layer means responsive to image units, each feature reduction map of said first feature detection layer means responsive to units from its corresponding constrained feature map, said constrained feature maps of said second feature detection layer means responsive to units from at least one feature reduction map in said first feature detection layer means, each feature reduction map of said second feature detection layer means responsive to units from its corresponding constrained feature map, said network further including a character classification layer fully connected to all feature reduction maps of said second feature detection layer means for generating an indication representative of the character recognized by the network.

2. The computation network defined in claim 1 wherein the selected nonlinear criterion includes a sigmoidal function.

3. The computation network defined in claim 2 wherein said image map includes a substantially constant predetermined background surrounding an original character image.

4. A massively parallel computation network for character recognition of a character included in an image map, said network including a first constrained feature detection layer means for extracting features from said image map, a first feature reduction layer means connected to said first constrained feature detection layer means for undersampling features from said first constrained feature detection layer means, a second constrained feature detection layer means for extracting features from said first feature reduction layer means, a second feature reduction layer means for undersampling features from said second constrained feature detection layer means, and character classification layer means fully connected to said second feature reduction layer means for generating an indication representative of the character recognized by the network.

5. The computation network defined in claim 4 wherein said image map includes a substantially constant predetermined background surrounding an original character image.

* * * * *